C. SCHWEIZER.
Animal-Traps.
No. 146,284.  Patented Jan. 6, 1874.
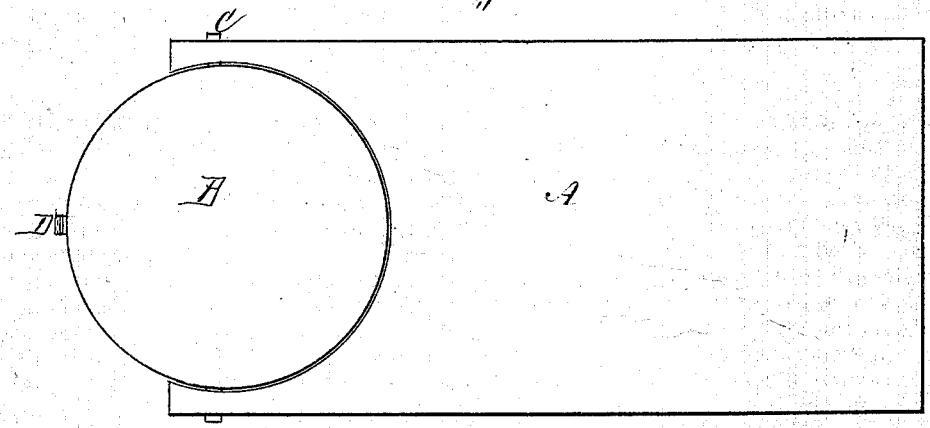
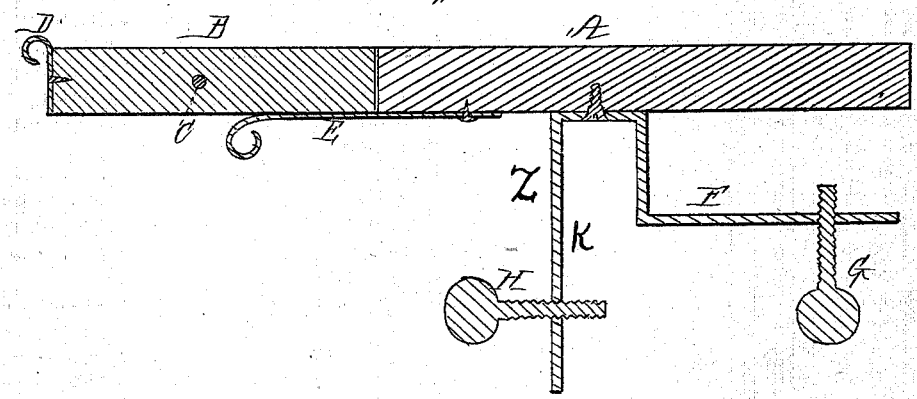

UNITED STATES PATENT OFFICE.

CHARLES SCHWEIZER, OF BOSTON, MASSACHUSETTS.

IMPROVEMENT IN ANIMAL-TRAPS.

Specification forming part of Letters Patent No. 146,284, dated January 6, 1874; application filed December 10, 1873.

*To all whom it may concern:*

Be it known that I, CHARLES SCHWEIZER, of Boston, in the county of Suffolk, State of Massachusetts, have invented a certain new and useful Improvement in Self-Setting Mouse and Rat Traps, of which the following is a description sufficiently full, clear, and exact to enable any person skilled in the art or science to which my invention appertains to make and use the same, reference being had to the accompanying drawing forming a part of this specification, in which—

Figure 1 is a top view or plan of my improved trap. Fig. 2 is a vertical longitudinal section of the same.

Like letters refer to like parts in the different figures of the drawing.

My improvement relates to that class of traps known as self-setting; and consists in a novel construction and arrangement of the parts, by means of which a more effective trap is produced, for the cost, than is afforded by any other method of construction with which I am acquainted.

In Fig. 1, A is the body or main platform; B, the trencher or tilting-table; C, the axis on which the trencher is hung; and D, an attachment to which the bait is fastened. In Fig. 2, E is a stop or spring attached to the under side of the platform A, and which is to prevent the table B from turning entirely around on its axis, and also to assist in turning it back to place when the trap is "sprung." Z is a duplex clamp, provided with the thumb-screws G and H for attaching the trap to a shelf or barrel, or to any convenient support.

The simplicity of my invention renders a lengthy description unnecessary. The trencher is arranged on the axis C, which passes through it laterally in such a position that the center of gravity and the center of motion in said trencher will be different, the center of motion always being nearer the attachment D than the center of gravity, and so much so that when the trap is baited the end of the table opposite the bait will be enough heavier than the baited end of the same to keep the trap "set" until sprung in catching a mouse, and, after being so sprung, to reset it again.

I denominate the part Z a "duplex clamp," it being so constructed from one piece of metal as to adapt the trap to be fastened to a shelf or any like horizontally-projecting support by means of the part F, or to be attached to the top of a barrel, or any convenient vertical support, by means of the part K.

The operation of my improved trap is as follows: The trencher being properly baited, the trap is attached to the shelf or other support by the clamp Z and proper screw, the trencher remaining in a horizontal position. The mouse, attracted by the bait, will advance along the platform A and onto the trencher B, until past the axis C, on which it is supported, when, as will be readily understood, the trencher will be tilted or upset, and the mouse precipitated into a vessel of water, which may be conveniently placed for the purpose.

The trencher is designed to be covered with tin, or made of very hard wood, and polished or varnished in such a manner as to afford no means for the mouse to escape when once it upsets the trencher, as explained.

Having thus described my invention, what I claim is—

The self-setting trap described, consisting of the platform A, gravitating trencher B, stop E, and duplex clamp Z, combined and arranged substantially in the manner set forth and specified.

CHARLES SCHWEIZER.

Witnesses:
JOHN MAY,
H. E. METCALF.